Feb. 7, 1961

H. C. PAULSEN 2,970,591

CEMENT HANDLING APPARATUS

Filed July 31, 1956

Inventor
Hans C. Paulsen
By his Attorney

Feb. 7, 1961

H. C. PAULSEN 2,970,591

CEMENT HANDLING APPARATUS

Filed July 31, 1956

Inventor
Hans C. Paulsen
By his Attorney

2,970,591
Patented Feb. 7, 1961

2,970,591

CEMENT HANDLING APPARATUS

Hans C. Paulsen, Lexington, Mass., assignor to United Shoe Machinery Corporation, Flemington, N.J., a corporation of New Jersey Filed July 31, 1956, Ser. No. 601,168

6 Claims. (Cl. 126—343.5)

This invention relates to cement handling apparatus, and particularly to a novel and improved apparatus for handling cement in rod form. It has been hitherto proposed, as for example as disclosed in United States Letters Patent No. 2,765,768, granted October 9, 1956, upon an application filed in my name, to dispense thermoplastic cement in the form of an elongated solid rod of indefinite length which is flexible enough to be wound into a coil from which it is subsequently withdrawn and fed into a melting and feeding device, and this manner of handling thermoplastic cement has numerous practical advantages which are now well understood and recognized by those skilled in the art. Among these advantages may be mentioned the ease of handling and dispensing, as well as the elimination of the danger of deterioration of the cement as the result of continued heating, inasmuch as only a small quantity of the cement is melted substantially as it is to be used. There may, however, be various working conditions requiring special cement formulations which it is difficult, and perhaps in some cases impossible, to obtain while still retaining in the solid rod of cement the necessary amount of flexibility to permit coiling and uncoiling as above suggested. In order to meet such conditions and at the same time to retain the numerous advantages which are attendant upon the use of cement in solid rod form, it is proposed to provide the solid rod cement in the form of rigid sticks of a definite length and to feed these sticks successively into the melting and feeding device.

It is, therefore, a principal object of this invention to provide a novel and improved apparatus for handling cement which is capable of accommodating rod cement in the form of rigid sticks of definite length. To this end, the herein illustrated apparatus comprises a device for melting cement in rod form and for feeding the molten cement to a point of use, in combination with mechanism for feeding successive sticks of cement in rod form to the melting and feeding device from a source of supply. More particularly, the cement handling apparatus comprises a melting and feeding device having a heated casing in which there is a rotary melting and feeding disk and which is provided with an inlet passage, a receptacle for receiving a plurality of sticks of cement in rod form, and mechanism including a power operated feeding member for removing sticks of cement from the receptacle in succession and for feeding the successive sticks of cement into the inlet passage in the casing of the melting and feeding device. Preferably, and as herein illustrated, the feeding mechanism includes a frictionally driven chain and a pair of feed lugs thereon and a common drive means is provided for rotating the melting and feeding disk and for operating the mechanism for feeding the successive sticks of cement in rod form to the melting and feeding device.

The above and other objects and features of the invention will be apparent from the following detailed description of the preferred embodiment which is illustrated in the accompanying drawings and will be pointed out in the claims.

Figure 1:
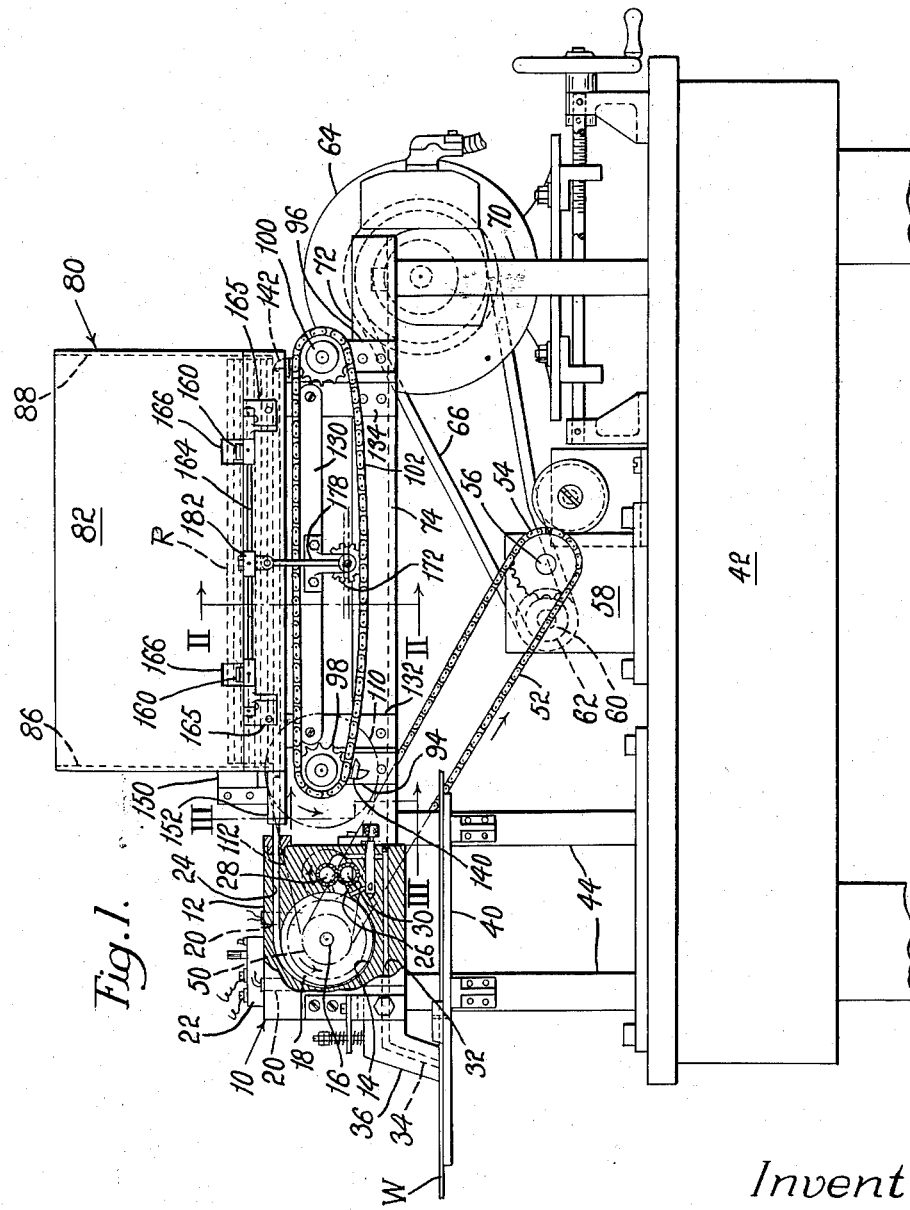
Fig. 1 is a view in side elevation of a cement handling apparatus embodying the features of this invention.

Referring to these drawings, and more particularly to Fig. 1, the cement handling apparatus which is therein illustrated includes a cement melting and feeding device, indicated generally by the reference character 10, and comprising a casing 12 provided with a chamber 14 in which there is rotatably mounted, on a shaft 16, a melting and feeding disk 18 of the type disclosed and claimed in the above-mentioned patent. The casing 12, which is heated by means of electrical heating units 20, 20, controlled by a thermostat 22, has an inlet passage 24 and an outlet passage 26. Associated with the outlet passage 26 is a pump comprising two gears 28, 30, adapted to deliver molten adhesive from the outlet passage to a discharge passage 32, formed in the casing, which is in communication with the delivery passage 34 of a nozzle 36. The melting and feeding device is mounted on a table or platform 40, which, in turn, is supported on a bench 42 by means of upright members 44, 44.

For driving the shaft 16 to rotate the melting and feeding disk there is secured on one end of this shaft which projects outwardly beyond the casing 12 a double sprocket 50, indicated diagrammatically in Fig. 1, over one portion of which there runs a chain 52 also trained over a second sprocket 54. The sprocket 54 is mounted on the output shaft 56 of a speed reducing gear 58 having an input shaft 60 on which there is a pulley 62. This pulley is driven by a motor 64, by means of a belt 66. As will be readily understood by reference to the above-mentioned patent, solid cement in rod form fed into the inlet passage 24 of the heated casing 12 will be melted and fed along to the outlet passage 26 by the rotating melting and feeding disk 18, and this molten cement will be delivered to the nozzle 36 by the gear pump 28, 30 through the discharge passage 34 in the casing. As illustrated in Fig. 1 of the drawings, the nozzle 36 is adapted to be used for applying cement to a work piece W, supported on a portion of the table 40 and moved past the nozzle in any convenient manner as, for example, by the operator.

Figure 2:
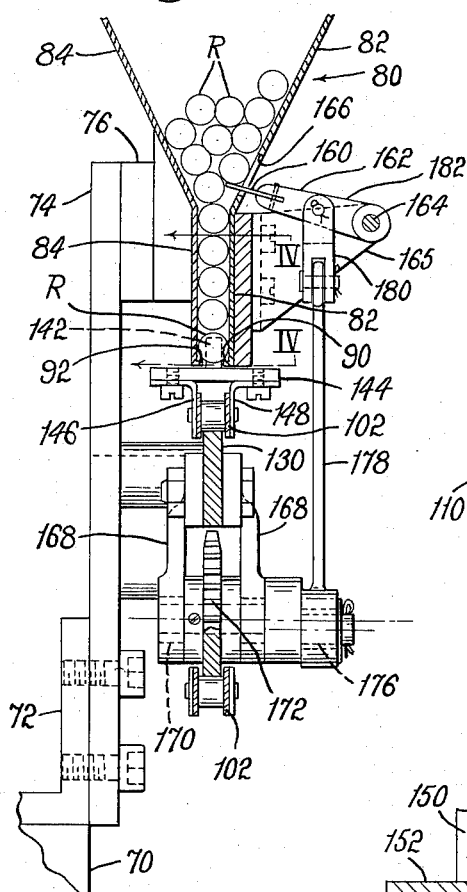
Fig. 2 is a view at an enlarged scale and in section, substantially on line II—II of Fig. 1 and looking in the direction of the arrows, of a portion of the apparatus shown in Fig. 1.

For supplying cement in rod form to the melting and feeding device, the following arrangement is provided. Supported at one end on the upright members 44, 44 and at its other end by a similar upright member 70, is a longitudinal member 72 to which there is secured a vertically disposed plate 74, Figs. 1 and 2. Mounted on two spacer blocks 76, secured to this plate, one of which blocks appears in Fig. 2, is a hopper-like receptacle, indicated generally by the reference character 80, having front and rear side walls 82, 84, respectively, shaped as shown in Fig. 2, and end walls 86, 88, see Fig. 1. The upper portion of the side walls 82 and 84 are inclined away from each other, see Fig. 2, to provide a space for receiving a number of stick-like rods R of solid cement of a length just slightly less than the distance between the end walls 86, 88 of the receptacle 80, Fig. 1, while the lower portions of these two walls are parallel and spaced apart by a distance which is just slightly greater than the diameter of the rods R. In order to retain the lowermost rod R against falling through between the adjacent side walls 82, 84, the lower ends of these walls are bent inwardly to provide spaced lips 90, 92. Rotatably mounted in bearing brackets 94, 96, secured to and extending upwardly from the longitudinal member 72, are two sprockets 98, 100 over which there is trained a chain 102.

Figure 3:
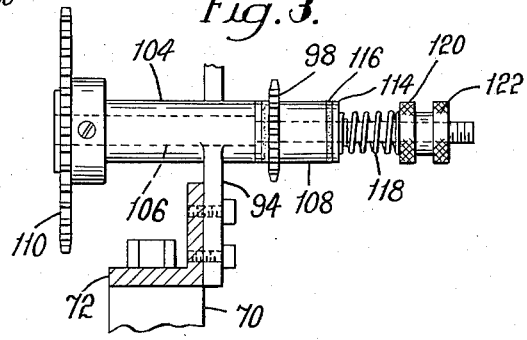
Fig. 3 is a view in end elevation and at an enlarged scale of a portion of the apparatus shown in Fig. 1 taken from a plane indicated by line III—III and looking in the direction of the arrows.

As is shown in Fig. 3, the bearing bracket 94 includes an elongated bearing portion 104 in which there is journaled a shaft 106. The sprocket 98 is provided with a hub portion 108 and is rotatably mounted on this shaft adjacent to one end of the bearing portion 104, and secured to the end of the shaft 106 which projects beyond the other end of this bearing portion is a drive sprocket 110. This drive sprocket 110, which is diagrammatically illustrated in Fig. 1 of the drawings, is connected to a portion of the double sprocket 50 on the shaft 16 by means of a chain 112, also diagrammatically illustrated in Fig. 1. Splined to the shaft 106 is a clutch member 114 having a friction disk 116 secured thereto which is adapted to be held yieldingly in frictional contact with the end of the hub portion 108 of the sprocket 98 by means of a compression spring 118, interposed between the clutch member and an adjusting nut 120 which is threaded onto the shaft 106 and held in adjusted position by means of a locknut 122, Fig. 3.

Figure 4:
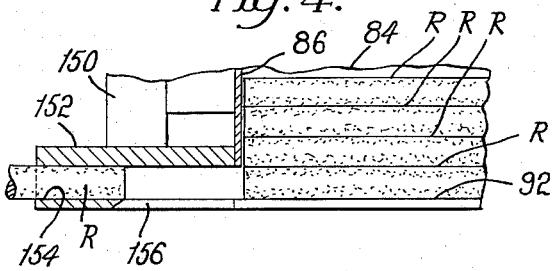
Fig. 4 is a view at an enlarged scale and in section substantially on line IV—IV of Fig. 2 and looking in the direction of the arrows, of a portion of the apparatus.

As is shown in Fig. 2 of the drawings, the upper end of the chain 102 is supported on a bar 130 which is mounted on upright members 132, 134 carried by the longitudinal member 72, see also Fig. 1. Secured to the chain 102, and spaced apart by distances substantially equal to one-half of the length of the chain, are two drive lugs 140, 142, Fig. 1, each of which is mounted on a cross member 144 connected to the chain by angle brackets 146, 148, Fig. 2. Each of these drive lugs is adapted to extend upward into the space between the lips 90, 92 and, when the chain 102 is driven, one or the other of these lugs will engage the right-hand end of the lowermost rod of cement R in the receptacle 80 and will propel this rod to the left. Referring to Fig. 4, there is secured to the left-hand end of the receptacle 80, by means of a bracket 150, a guide tube 152 having a bore 154 which is in alinement with the inlet passage 24 of the melting and feeding device 10 and also with the lowermost rod of cement R in the receptacle 80. This guide tube is slotted, as indicated at 156, Fig. 4, in order to permit passage therethrough of the lugs 140, 142 as they, respectively, move out of engagement with the right-hand or trailing end of each successive rod of cement.

In order to prevent jamming of the rods of cement R in the receptacle 80 as these rods pass downward into the space between the lower parallel portions of the side walls 82, 84, two lifting, or agitating fingers 160, 160 are provided. These fingers are each mounted on the end of an arm 162, which is secured to a rockshaft 164, mounted in brackets 165, and project into the receptacle through openings 166, 166 formed in the side wall 82, Figs. 1 and 2. Journaled in two bearing bracket members 168, 168, suspended from the above-mentioned bar 130, is a shaft 170 to which there is secured a sprocket 172, this sprocket, and therefore the shaft 170, being adapted to be driven by the chain 102. At its right-hand end, Fig. 2, the shaft 170 is formed with a crank pin 176 on which there is mounted a connecting rod 178. At its upper end this rod is connected, by means of a clevis block 180 to an arm 182 which is secured to the rockshaft 164. As will be apparent, when the sprocket 172 is rotated, the fingers 160, 160 will be moved upwardly and downwardly to lift the rods in the upper portion of the receptacle 80, thereby preventing any jamming of the rods which might otherwise occur.

In use, when the motor 64 is started, the melting and feeding disk 18 and the drive sprocket 110 will each be rotated in the direction of the arrows thereon in Fig. 1.

As the lowermost rod R of cement in the receptacle 80 is engaged by a driving lug 140 or 142, this rod will be moved to the left through the guide tube 152 and into the inlet passage 24 in the casing 12. The leading end of this rod will be progressively melted and fed along to the outlet 26 by the action of the melting and feeding disk 18 and the molten cement will be delivered to passageway 32 and extruded from the nozzle 36 by the pump 28, 30 in a manner which will be readily apparent from a consideration of the above-mentioned patent. Inasmuch as the distance between the two lugs 140, 142 is somewhat greater than the length of the rods R, when one of these lugs moves out of engagement with the trailing end of a rod within the bore 154 of the tube 152, and passes down through the slots 156, Fig. 4, there will be a slight gap between the trailing end of this rod and the leading end of the next succeeding rod. However, the diameter of the sprocket 110 is so selected that the speed of rotation of this sprocket is such as would produce a linear rate of movement of the driving lugs 140, 142 and also of the successive rods of cement R which is somewhat in excess of the rate of movement of the cement through the melting and feeding device 10, which latter rate of movement is regulated not only by the speed of rotation of the melting and feeding disk but also by the action of the gear pump 28, 30. Thus, while each successive rod is being fed along by one or the other of the drive lugs, the clutch member 114 will be rotated at a speed which is greater than that of the sprocket 98 and the friction disk 116 will be continually slipping on the hub 108 of the sprocket 98. Accordingly, after one lug moves out of engagement with the trailing end of the rod which it has been feeding into the melting and feeding device, the chain 102 will momentarily travel at an increased rate of speed until the leading end of the next succeeding rod is brought into contact with the trailing end of the preceding rod, whereupon the clutch member 114 will again begin to slip and the normal feed rate of the lugs will be resumed.

Having thus described my invention, what I claim as new and desire to secure by Letters Patent of the United States is:

1. A cement handling apparatus having, in combination, a device for melting cement in rod form and for feeding the molten cement to a point of use, said device comprising a casing having a rotary melting and feeding disk therein and provided with an inlet passage, and means for heating the casing and disk, a receptacle for receiving and storing a plurality of sticks of cement in rod form, mechanism including a chain having a pair of feed lugs thereon for removing said sticks of cement in rod form from said receptacle in succession and for feeding successive sticks of cement in rod form into the inlet passage of said melting and feeding device, and a common drive means for rotating said melting and feeding disk and for driving said chain.

2. A cement handling apparatus having, in combination, a device for melting cement in rod form and for feeding the molten cement to a point of use, said device comprising a casing having a rotary melting and feeding disk therein and provided with an inlet passage, and means for heating the casing and disk, a receptacle for receiving and storing a plurality of sticks of cement in rod form, mechanism including a chain having a pair of feed lugs thereon for removing said sticks of cement in rod form from said receptacle in succession and for feeding successive sticks of cement in rod form into the inlet passage of said melting and feeding device, and a common drive means for rotating said melting and feeding disk and for frictionally driving said chain.

3. A cement handling apparatus having, in combination, a device for melting cement in rod form provided with means for feeding the molten cement to a point of use, a receptacle for receiving and storing a plurality of sticks of cement in rod form, mechanism including a chain having a pair of feed lugs thereon for removing said sticks of cement in rod form from said receptacle in succession and for feeding successive sticks of rod cement to said melting and feeding device, and a common drive means for operating the feeding means and for driving the chain at a speed capable of producing a rate of linear movement of each succeeding stick of cement by the chain somewhat in excess of the rate of movement of the cement through the melting and feeding device by the feeding means.

4. A cement handling apparatus having, in combination, a device for melting cement in rod form provided with means for feeding the molten cement to a point of use, a receptacle for receiving and storing a plurality of sticks of cement in rod form, mechanism including a chain having a pair of feed lugs thereon for removing said sticks of cement in rod form from said receptacle in succession and for feeding successive sticks of rod cement to said melting and feeding device, and a common drive means for operating the feeding means and for frictionally driving the chain at a speed capable of producing a rate of linear movement of each succeeding stick of cement by the chain somewhat in excess of the rate of movement of the cement through the melting and feeding device by the feeding means.

5. A cement handling apparatus having, in combination, a device for melting cement in rod form and for feeding the molten cement to a point of use, said device comprising a casing having a rotary melting and feeding disk therein and provided with an inlet passage, and means for heating the casing and disk, a receptacle for receiving and storing a plurality of sticks of cement in rod form, mechanism including a chain having a pair of feed lugs thereon for removing said sticks of cement in rod form from said receptacle in succession and for feeding successive sticks of cement in rod form into the inlet passage of said melting and feeding device, and a common drive means for rotating said disk and for driving the chain at a speed capable of producing a rate of linear movement of each succeeding stick of cement by the chain somewhat in excess of the rate of movement of the cement through the melting and feeding device by said disk.

6. A cement handling apparatus having, in combination, a device for melting cement in rod form having means for feeding the molten cement to a point of use, said device comprising a casing having a rotary melting and feeding disk therein and provided with an inlet passage and means for heating the casing and disk, a receptacle for receiving and storing a plurality of sticks of cement in rod form, mechanism including a chain having a pair of feed lugs thereon for removing said sticks of cement in rod form from said receptacle in succession and for feeding successive sticks of cement in rod form into the inlet passage of said melting and feeding device, and a common drive means for operating the feeding means and for frictionally driving the chain at a speed capable of producing a rate of linear movement of each succeeding stick of cement by the chain somewhat in excess of the rate of movement of the cement through the melting and feeding device by said disk.

References Cited in the file of this patent

UNITED STATES PATENTS

| | | |
|---|---|---|
| 1,490,594 | De Lateuer | Apr. 15, 1924 |
| 1,530,387 | Marra | Mar. 17, 1925 |
| 1,980,589 | Acree | Nov. 13, 1934 |
| 2,207,426 | Bailey | July 9, 1940 |
| 2,300,083 | Worthington | Oct. 27, 1942 |
| 2,773,496 | Czarnecki | Dec. 11, 1956 |
| 2,804,871 | Paulsen | Sept. 3, 1957 |